July 7, 1942.  J. A. CALDWELL  2,288,679
MEASURING INSTRUMENT
Filed June 24, 1938    5 Sheets-Sheet 1

INVENTOR.
JOHN A. CALDWELL
BY George M. Urschampf
ATTORNEY

July 7, 1942. J. A. CALDWELL 2,288,679
MEASURING INSTRUMENT
Filed June 24, 1938 5 Sheets-Sheet 2

INVENTOR.
JOHN A. CALDWELL
BY George M. ​_______
ATTORNEY

July 7, 1942.  J. A. CALDWELL  2,288,679
MEASURING INSTRUMENT
Filed June 24, 1938   5 Sheets-Sheet 3

INVENTOR.
JOHN A. CALDWELL
BY [signature]
ATTORNEY

July 7, 1942.                J. A. CALDWELL                2,288,679
                          MEASURING INSTRUMENT
                          Filed June 24, 1938            5 Sheets-Sheet 4

INVENTOR.
JOHN A. CALDWELL
BY [signature]
ATTORNEY

Patented July 7, 1942

2,288,679

UNITED STATES PATENT OFFICE 2,288,679

MEASURING INSTRUMENT

John A. Caldwell, Philadelphia, Pa., assignor to The Brown Instrument Company, Philadelphia, Pa., a corporation of Pennsylvania Application June 24, 1938, Serial No. 215,568

23 Claims. (Cl. 171—95)

The present invention relates to potentiometers of the type that indicate, record and control a variable condition such as temperature. It is usual in potentiometers of this type to have a thermocouple in circuit with a galvanometer that will be deflected upon variations in the thermocouple E. M. F. due to changes in temperature. This deviation is measured by some suitable means that actuates or regulates another means to rebalance the galvanometer. The rebalancing of the galvanometer may be accomplished by changing the effective length of a slide-wire in an ordinary and well-known potentiometer network. Potentiometers of this type usually have a cyclic operation in which the galvanometer pointer is periodically clamped in its then position, and the position thereof measured by some suitable means that initiates a balancing operation. The objection to this operation is generally that the pointer is clamped for too large a part of each cycle, since before the pointer has time to assume a correct position after a balancing operation, it is again clamped in position for the succeeding cycle. Another objection is that the balancing mechanism is often complicated and cumbersome to start and stop, with the result that an accurate and rapid slide-wire movement cannot be obtained.

It is a specific object of my invention to provide a mechanism of the above type in which the galvanometer pointer is free for a large percentage of each cycle and is therefore enabled to have time enough to accurately assume a new position before it is again clamped. This desirable result is accomplished by the use of a primary feeler to contact the pointer, which primary feeler sets a secondary feeler and is then moved to its initial position and the pointer freed, while the balancing operation that follows is controlled by the position of the secondary feeler.

It is a further object of my invention to provide a mechanism for performing the balancing operation that is simple, effective, and accurate and one that will prevent over-travel of the slide-wire in its movement. This mechanism consists of a reversible motor that has two fields which are separately energized, depending upon the direction of deflection of the galvanometer pointer. One field is energized to cause the motor to run, and the other is energized to stall the motor a variable time after the first, depending upon the amount of deflection of the pointer from a mid-position. This differential energization of the motor fields provides immediate starting and stopping thereof for the proper length of time. The motor is connected to and drives the slide-wire, the indicating and recording mechanism, and the mechanism for controlling the condition that is being measured.

It is a further object of the invention to have all of the mechanism, above described, enclosed in a case that is of a practical size and shape and of a neat appearance. These and other objects will be apparent from the detailed description and claims that follow.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Of the drawings.

Throughout the following description, the same reference numeral is used for the same part in all of the modifications.

Figure 1:
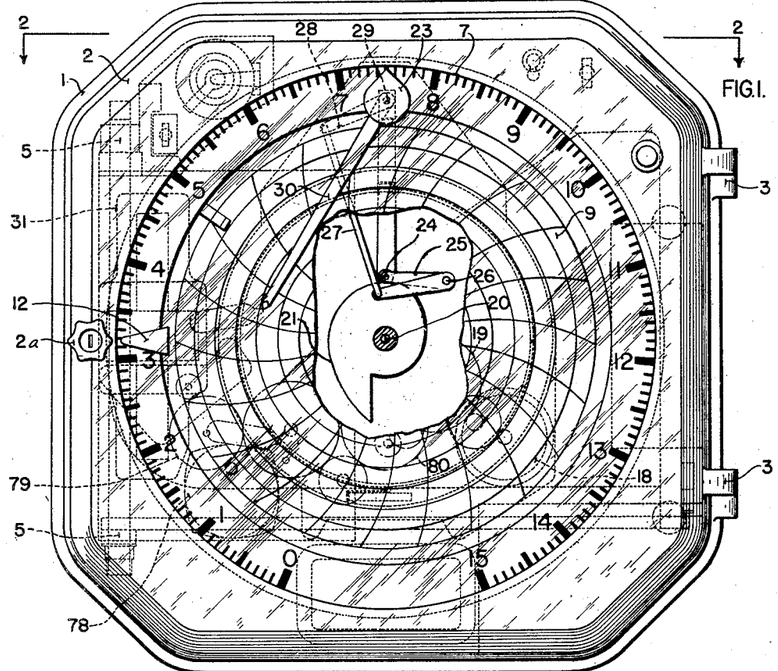
Fig. 1 is a front view of the potentiometer in its case.
Figure 2:
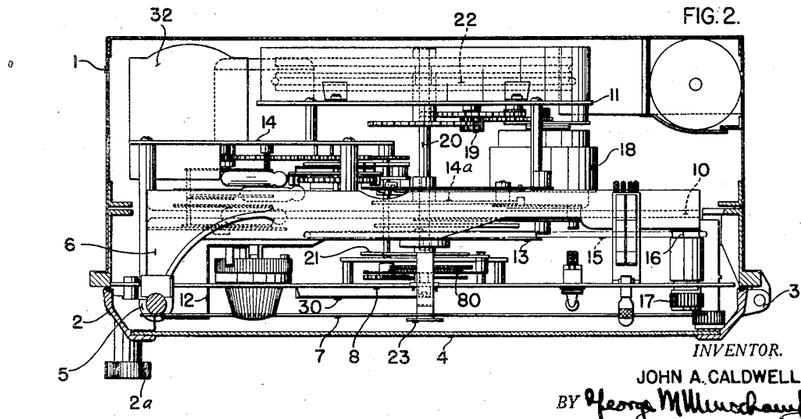
Fig. 2 is a view taken on line 2—2 of Fig. 1.

Referring to Fig. 1 and Fig. 2 which are intended to show generally the location of the various parts of a complete potentiometer mechanism there is shown a casing 1 that houses the mechanism of my device. This casing is closed by a door 2 that is hinged to the casing 1 on its right side at 3 and that contains a glass window 4 and is provided with a knob 2a which also serves as a lock and is used to prevent unauthorized access to the mechanism housed within the casing. Within the casing on the left side are hinges 5 for a support 6 upon which is mounted the potentiometer mechanism. When the door 2 is opened, the support 6 and its associated mechanism may be swung out of the casing around the hinges 5 for inspection and cleaning.

Mounted on the support 6 is a large indicating dial 7, a backing plate 8 for a chart 9 of circular form, and two supporting plates 10 and 11.

An index 12 for the control mechanism extends in front of indicating dial 7 and is attached to pulley 13. The control mechanism indicated generally at 14 may be adjusted by rotating the pulley 13 from a spring belt 15 that also passes over a small manually driven pulley 16 which is rotated by knob 17. This control mechanism forms no part of my present invention, but it may be stated that it is actuated by the same mechanism that rotates the slide-wire, which mechanism is to be described later.

Attached to the lower part of plate 10 is a motor 18 that, through gearing 19, rotates a shaft 20 journaled in plates 10 and 11. This shaft has mounted on it a cam 14a for actuating the control mechanism, a cam 21 for actuating the indicating and recording mechanism and a slide-wire 22 which is used in an ordinary potentiometer network to balance a galvanometer. Potentiometric circuits of the type contemplated herein are well known, such, for example, as disclosed in the Harrison Patent 1,898,124, and include, as shown in Fig. 5A, a known source of voltage V impressed across the resistor 22 commonly termed the instrument slide-wire, the galvanometer 31 and source of variable voltage, such as a thermocouple T, being connected in series to oppose the known voltage across a variable portion of said resistor. When a variable voltage, for a given adjustment of the slide-wire, is equal and opposite to the known voltage, the galvanometer is in its null position, but on an increase above or decrease below the known voltage of the unknown voltage, the galvanometer will be deflected in one direction or the other respectively proportionately to the magnitude of the increase or decrease. This invention is concerned with the means by which deflections of said galvanometer control slide-wire adjustments which may be effected by relative adjustment of slide-wire 22 and contact 22x to continuously rebalance the potentiometer system.

Fastened to the face of cam 21 is a pointer 23 that rotates therewith to indicate on dial 7 the then value of the condition being measured and controlled, and bearing on its surface is a roller 24 attached to bell-crank 25 pivoted at 26. This roller rises and falls, as the cam 21 rotates with shaft 20, to move a pen across chart 9 to give a continuous record of the value of the condition. The other arm of bell-crank 25 is attached to a link 27 whose upper end is connected to lever 28 that moves shaft 29 in a bearing in the frame. A pen arm 30 is attached to the front of shaft 29 and extends down in front of chart 9 so that, with the rise and fall of roller 24 on cam 21, as that cam is rotated, the pen arm will be swung across the chart to make a record line thereon.

Mounted back of plate 10, and completely housed in casing 32, is a galvanometer 31, the coil 33 of which has attached for movement therewith a pointer 34 that extends through the front of casing 32. The pointer 34 extends below a stationary abutment 35 (Figure 3) and above a movable abutment 36 which is normally forced upward into clamping engagement with the pointer 34 by spring 37. A means for moving the abutment 36 into and out of clamping engagement is provided by a pin 38 attached to the abutment, which pin is surrounded by the forked end 39 of a lever 40 that is adjustably attached to a part 42 pivoted at 41 on the housing 32. This lever 40 is provided with a slot 43 that receives a pin 44 on a primary feeler 45 (see Figs. 5 and 5B) which is pivoted on shaft 47, and adjustably secured to an arm 46 that is attached to the shaft. The shaft 47 is journaled in plate 10 and extends through the front of a small housing 48 which, together with a cover therefor (not shown), serves to enclose and protect the galvanometer pointer 34, the abutment members 35 and 36, the moving levers and the feeler 45.

A means for rotating the shaft 47, and thereby clamping the pointer 34 and moving feeler 45 into engagement with it, consists of a lever 49, in front of housing 48, attached to the shaft 47. The lever 49 has a downwardly extending finger 49a and a roller 50 (Fig. 5) that is acted upon by a constantly rotating cam 51 on shaft 52 driven at a constant speed from a motor to be later described. It will be seen that the feeler 45, arm 46, shaft 47 and lever 49 move as a unit and are in effect a single lever that is biased in a clockwise direction (Figure 3) by a spring 47a toward engagement with the pointer 34.

As cam 51 moves the lever 49 in a counter-clockwise direction around shaft 47, the pin 44 of the feeler engages the lower end of slot 43 to move lever 40 clockwise, and the fork 39 of said lever 40, surrounding pin 38, then lowers the abutment 36 against the force of spring 37 to free the pointer 34. As cam 51 permits the lever 49 to move clockwise under the bias of spring 47a, the pin 44 of the feeler 45 permits lever 40 to move counter-clockwise so that abutment 36 can clamp the pointer 34 in place against abutment 35. Continued movement of lever 49 clockwise under force of spring 47a will then move feeler 45 against the pointer in its clamped position and thus stop the finger 49a in a position corresponding to that of the pointer.

The primary feeler 45, 49 positions a secondary feeler 53 that is pivoted at 54 on a yoke 55 that is in turn pivoted on a shaft 56 which is mounted in plate 10. The secondary feeler 53 has a pin 57 adjustably positioned in a slot therein, a pin 58 that extends through both sides of the feeler and an upper arcuate shaped edge 59 which acts as a brake-surface. This secondary feeler 53 is normally biased in a clockwise direction around 54 by spring 60 so that pin 57 will engage finger 49a of the primary feeler and thus hold the pin 58 on feeler 53 in a position corresponding to that of finger 49a and pointer 34. A brake-member 61, for the secondary feeler 53, having an in-turned edge 62 is pivoted on shaft 56 and biased in a counter-clockwise direction by spring 63 until edge 62 engages the brake-surface 59 on the feeler 53 to at times hold the feeler in its adjusted position. The edge 62 is lifted from surface 59 by engagement between a roller 63a on cam 51 and arm 61a of the brake-member 61 (Figure 5).

Also mounted on and rotatable with shaft 52 is a cam 64 that engages a roller 65 on the yoke 55 to periodically oscillate the yoke, the secondary feeler 53 pivoted thereon, and the brake-member 61 clockwise as a unit, against their gravity and spring bias around shaft 56 from the full line to the dotted line position of Fig. 3C. The cam 64 has an arm 66 attached to it, the arm having a roller 67 on its outer end that serves to engage edge 53a of feeler 53 to force it counter-clockwise against the tension of spring 60 and then permit the feeler to slowly return until pin 57 engages finger 49a. As the secondary feeler rises, due to engagement between cam 64 and roller 65, its pin 58 engages first one and then the other of the crossed ends of levers 68 and 69 to move them clockwise around shaft 56, upon which they are pivotally mounted. This movement is against their gravitational bias, in a counter-clockwise direction, that is limited by engagement of their downwardly projecting edges 68a and 69a with shaft 77. Each of these levers 68 and 69 carries on a bracket attached thereto a mercury switch 70 or 71 that is in circuit with one of the fields of reversible motor 18.

Mounted below and to one side of the above-described mechanism on a shaft 72 is a combined lever and bracket 74 upon which is mounted a mercury switch 75 that is in the common line of motor 18. This lever is normally biased in a counter-clockwise direction by spring 73 so that its roller 76 will engage the surface of cam 51. When the low part of the cam is under roller 76, arm 74a will engage shaft 77 to limit counter-clockwise rotation of bracket 74.

A constantly rotating motor 78 drives the shaft 52 and its associated cams 51 and 64 through a suitable gear train 79. This motor also drives the chart 9 through another gear train 80 (shown in dot and dash lines in Fig. 1) at a suitable speed of, for example, one rotation every twenty-four hours.

Figures 3, 3A, 3B, 4:
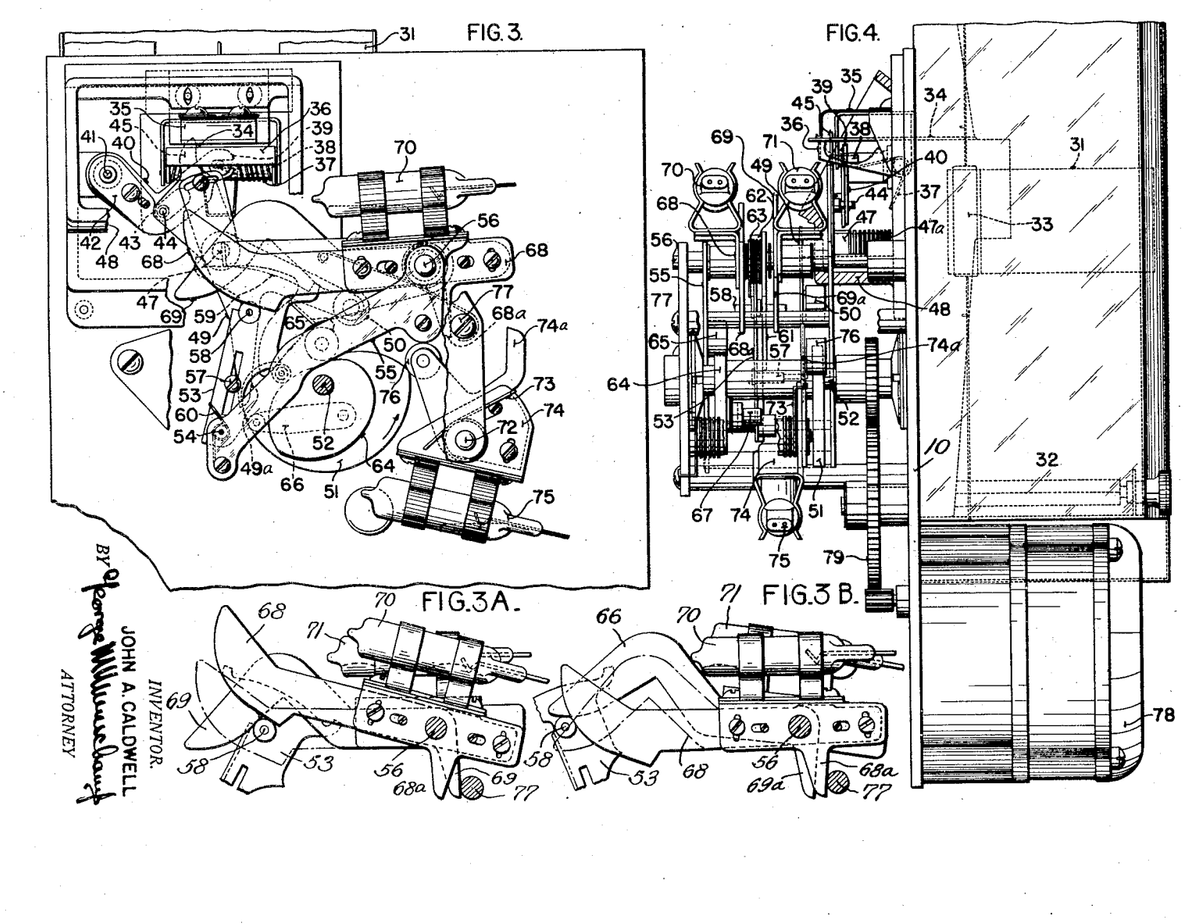
Fig. 3 is a view on a larger scale of the balancing mechanism used in the device.
Figs. 3A, 3B and 3C show detail views of various parts in Figure 3.
Fig. 4 is a view looking from the right of Fig. 3.
Figures 3C, 5, 5A, 6:
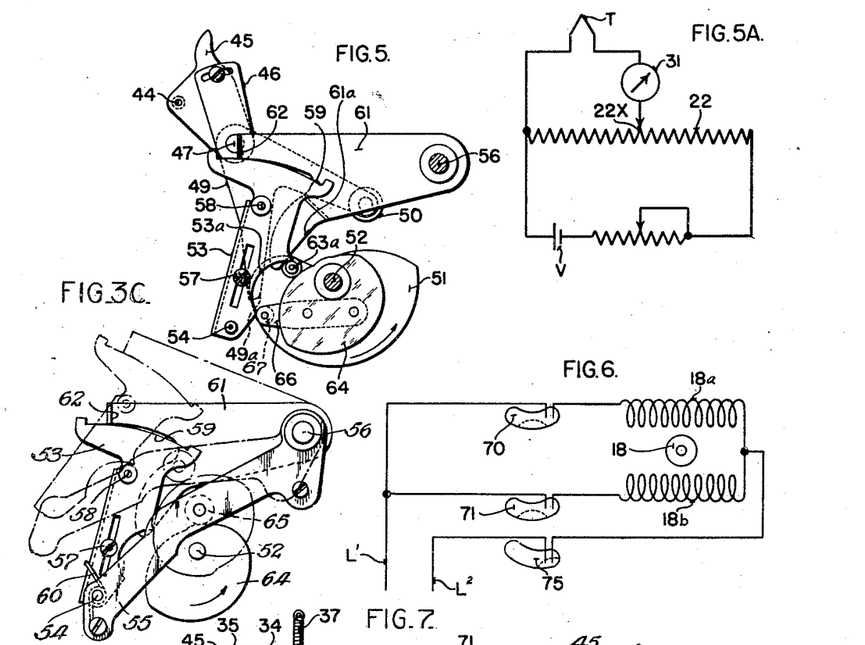
Fig. 5 is a view of the primary and secondary feelers with their actuating cams.
Fig. 5A is a diagrammatic wiring diagram of a potentiometer circuit.
Fig. 6 is a wiring diagram for the balancing motor.

In the operation of the device, starting with the parts in the position of Figs. 3-5 in which the galvanometer pointer 34 has been clamped, the primary and secondary feelers have been positioned in accordance therewith, and the brake-member 61 has its edge 62 on arcuate surface 59 of the secondary feeler to hold it in its adjusted position. Also the high portion of cam 51 has just come under roller 76 to move switch 75 to its closed position while the low portion of cam 64 is under roller 65 of yoke 55.

Continued counter-clockwise rotation of the cams 51 and 64 will bring the high portion of cam 51 under roller 50 of the primary feeler 45, 49 to move that feeler away from pointer 34 and move the abutment 36 downwardly to free the pointer. Thus, it is seen that the galvanometer pointer is freed from any restraint before the balancing operation begins. Just as the above operation has taken place, the high portion of cam 64 begins to come under roller 65 to start the balancing operation. As shown, the pointer 34 is to the left of its mid-position and, therefore, the secondary feeler 53 to the right of the vertical as shown in Figure 3A. If the pointer 34 were in mid-position, feeler 53 would be vertical and pin 58 would be directly under the point at which the lower edges of levers 68 and 69 cross each other, and, for a deflection to the right of mid-position of pointer 34, the feeler 53 would be positioned to the left of the vertical as shown in Figure 3B. The above statements are obvious from an inspection of Fig. 5 in which it will be seen that the further to the right feeler 45 is moved, the further to the left finger 49a, moving therewith, will move pin 57 on feeler 53.

As yoke 55 is moved upwardly or clockwise around shaft 56 by engagement between its roller 65 and cam 64 from its full to its dotted line position of Figure 3C, the feeler 53 attached thereto will also be moved and will in turn force brake-member 61 to move around its pivot on shaft 56. Upon upward movement of feeler 53, pin 58 will engage the lower surface of lever 68 to tilt this lever and its attached switch 70 around the shaft 56 and cause the switch to close as shown in Figure 3A. Continued upward movement of pin 58 will at some later time bring it into contact with the lower surface of lever 69 to tilt that lever and cause its switch 71 to also close. The angular position of feeler 53 and therefore the vertical plane in which the pin 58 is positioned determines whether lever 68 or 69 is contacted first and the amount of time one of the switches 70 or 71 is closed before the other is closed.

After the highest portion of cam 64 has come under roller 65 and both levers 68 and 69 have been tilted, regardless of the position of pin 58, the low portion of cam 51 comes under roller 76 and spring 73 moves frame 74 to a counter-clockwise position in which finger 74a engages stop shaft 77 permitting switch 75 to open. The manner in which these switches energize motor 18 to rotate the slide-wire will be explained below after the description of a cycle of operation is completed.

Immediately after switch 75 is opened, the cams have reached a position in which yoke 55 and its attached parts are to be lowered and a new measurement of the position of the pointer is to be made. When the low portion of cam 51 starts under roller 50, the primary feeler moves clockwise under the bias of spring 47a to permit a clamping of the pointer 34 at its new position, as above described, and at the same time roller 63a on cam 51 engages edge 61a of the brake 61 to lift it from surface 59 of the feeler 53. Also at this time, roller 67, attached to cam 64, engages the upper part of edge 53a of feeler 53 to move the feeler counter-clockwise against the force of spring 60 to the limit of its movement, thus permitting the primary feeler and its finger 49a to move without any restraint. Continued rotation of the cam 51 lowers the roller 50 until the primary feeler 45 has assumed its position in engagement with pointer 34, and roller 67 on cam 64 moves along the arcuate edge 53a to slowly allow feeler 53 to move clockwise until pin 57 engages finger 49a, thus setting the secondary feeler. The roller 63a on cam 51 now runs off edge 61a so that brake 61 is applied to the surface 59 of feeler 53 to hold it in position. The parts are now in the position that they were at the beginning of a cycle.

In Fig. 6 there is shown a wiring diagram to indicate how the switches 70, 71 and 75 control the motor 18 which rotates the slide-wire and sets the pen 30 and indicating hand 23. The switch 70 is in one field 18a, and the switch 71 is in another field 18b of the motor 18. Each of these fields when energized causes the motor to rotate in an opposite direction, and when both are energized the motor is stalled. The switch 75 is in a line that goes to the source of power from a common lead to both fields. At the beginning of a cycle, as shown in Fig. 3, switches 70 and 71 are open while switch 75 is closed.

When pin 58 rises and engages lever 68 to tilt it around shaft 56, the switch 70 is closed and current flows from the source at L' through the field 18a and through switch 75 to L², thus energizing the motor 18 to cause it to rotate in the correct direction. This rotation continues until pin 58 engages and tilts lever 69 causing switch 71 to close and energize field 18b, thus stalling the motor. The length of time that either field is energized alone depends upon the amount of deviation of pointer 34 from its balanced mid-position. The inclination of secondary feeler 53, and therefore the position of pin 58, determines which lever 68 or 69 will be engaged and tilted first by the pin and therefore determines which direction the motor will rotate. After both switches 70 and 71 have been closed, due to their tilting by pin 58, the cam 51 will have rotated to a position in which bracket 74 will be tilted to open switch 75. This simultaneously deenergizes both fields of the motor and prevents another energization thereof as the levers 68 and 69 are lowered to their initial positions for the beginning of another cycle.

From the above description, it is seen that the pointer 34 is clamped for only a short portion of each cycle and is free to assume a new position during the rebalancing operation. It will also be seen that the motor will be energized in a direction and for an amount of time depending upon the deviation of the pointer 34.

Figures 5B, 7:
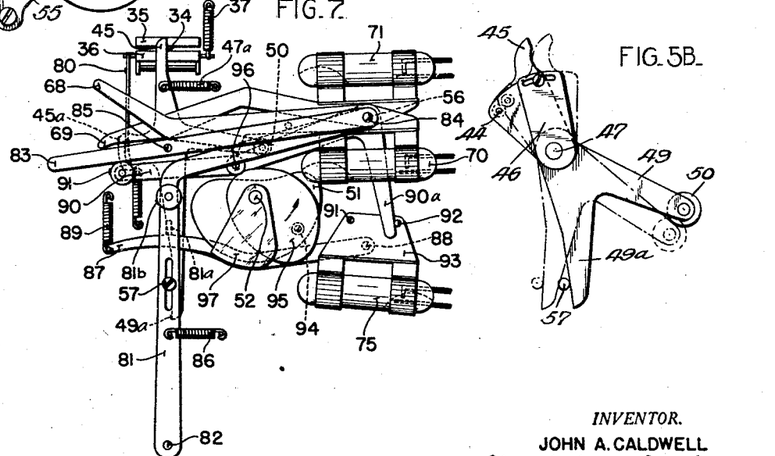
Fig. 5B is a view of the primary feeler.
Fig. 7 is a view of another type of balancing mechanism using the principles of my invention.

In the embodiment of Fig. 7, the same result is accomplished by means of a slightly different relay mechanism. In this form of the invention, primary feeler 45 has formed as a part thereof an extension 45a that has a slot therein which receives one end of a link 80, the other end of which is attached to the movable clamping member 36, so that as cam 51 rotates to move the feeler 45 in a counter-clockwise direction, the link 80 will engage the upper end of the slot in extension 45a and lower member 36 to free the pointer 34. The secondary feeler in this form of the invention consists of an angularly shaped member 81 pivoted at 82 and having at its upper end a lever 83 that is pivoted thereto at a point 84 which is axially aligned with and in front of shaft 56 for a setting corresponding to a mid-position of pointer 34. The lever 83 has a pin 85 extending from its rear surface under the lower edges of levers 68 and 69. As the feeler 45 moves clockwise under the influence of spring 47a, first the link 80 permits member 36 to rise to grip the pointer 34, and then the feeler 45 sweeps across until it engages the pointer. This causes its lower end 49a to engage pin 57 of the secondary feeler and move that in a counter-clockwise direction against the force of spring 86 until the secondary feeler 81 is positioned in accordance with the primary feeler 45, which is in turn positioned in accordance with the then setting of the pointer 34. Movement of secondary feeler 81 causes a corresponding movement of lever 83 with its pin 85. A brake 87 to hold the secondary feeler in its adjusted position is pivoted at 88 and is pulled upwardly by spring 89 into engagement with an abutment 81a extending from the rear of the secondary feeler 81.

In order to lift the pin 85 into engagement with levers 68 and 69, there is provided an angularly shaped lever 90, also pivoted on shaft 56, which has on one leg a roller 91 extending from its front surface under lever 83; the other leg 90a extends downwardly between two pins 91 and 92 mounted on member 93 that supports the switch 75 for tilting movement around shaft 88. As in the modification of Figs. 1–5, the shaft 52 has mounted on it a cam 51 for moving the primary feeler 45 out of engagement with the pointer 34. This cam 51 is provided with a roller 94 that periodically, during the rotation of the cam, engages the upper edge of brake-member 87 to release the brake so that the secondary feeler can be moved to its new position. Also mounted on the shaft 52 are two other cams 95 and 97, the former of which acts on roller 96 to raise and lower lever 90, and the latter of which holds the secondary feeler 81 in its mid-position prior to the time it is acted upon by the primary feeler.

In the operation of this modification, starting with the parts in the position shown, the cams rotate in a counter-clockwise direction, and cam 95 first engages roller 96, to raise lever 90 and, by means of roller 94 raises lever 83 around its pivot 84 on feeler 81 to bring pin 85 into engagement with the bottom edges of levers 68 and 69. These levers are tilted to close switches 70 and 71 to energize motor 18 in a manner described in detail above. Just as lever 90 reaches its highest position, arm 90a will engage pin 91 and tilt member 93 to open switch 75 and deenergize the motor. As the cam 95 is lifting lever 90, cam 51 will engage roller 50 to move the primary feeler so that the pointer 34 will be free during the balancing operation.

Inasmuch as most of the time the pointer 34 will be operating in a range that is near its mid-position, a provision is made for setting the secondary feeler in its mid-position prior to the time that the feeler 45 engages the pointer. As cam 51 is rotating, roller 94 thereon will engage the upper surface of brake-member 87 and move it away from abutment 81a, thus permitting feeler 81 to move clockwise under the influence of spring 86 until roller 81b engages cam 97 which, during its rotation, will move the feeler back to its mid-position. At this time, the low portion of cam 51 is coming under roller 50 so that another measurement of the position of pointer 34 can be made by feeler 45. As the lower end 49a of feeler 45 moves to the left, it will engage pin 57 on feeler 81 to set this feeler in its proper position. If the end 49a is to the right of its mid-position, feeler 81 will move against it with roller 81b following the cam 97, and if the end 49a is to the left of mid-position, it will force feeler 81 against the spring 86 to the proper point. As the lowest portion of cam 51 comes under roller 50, the roller 94 will ride off the top edge of the brake-member 87 so that the brake will be pulled by spring 89 into engagement with abutment 81a to hold the secondary feeler 81 in place. During this time, lever 90 has been lowered by cam 95 until end 90a has engaged pin 92 to move member 83 to a position to close switch 75. The parts are now back to where a new cycle of operation is to be begun.

Figure 8:
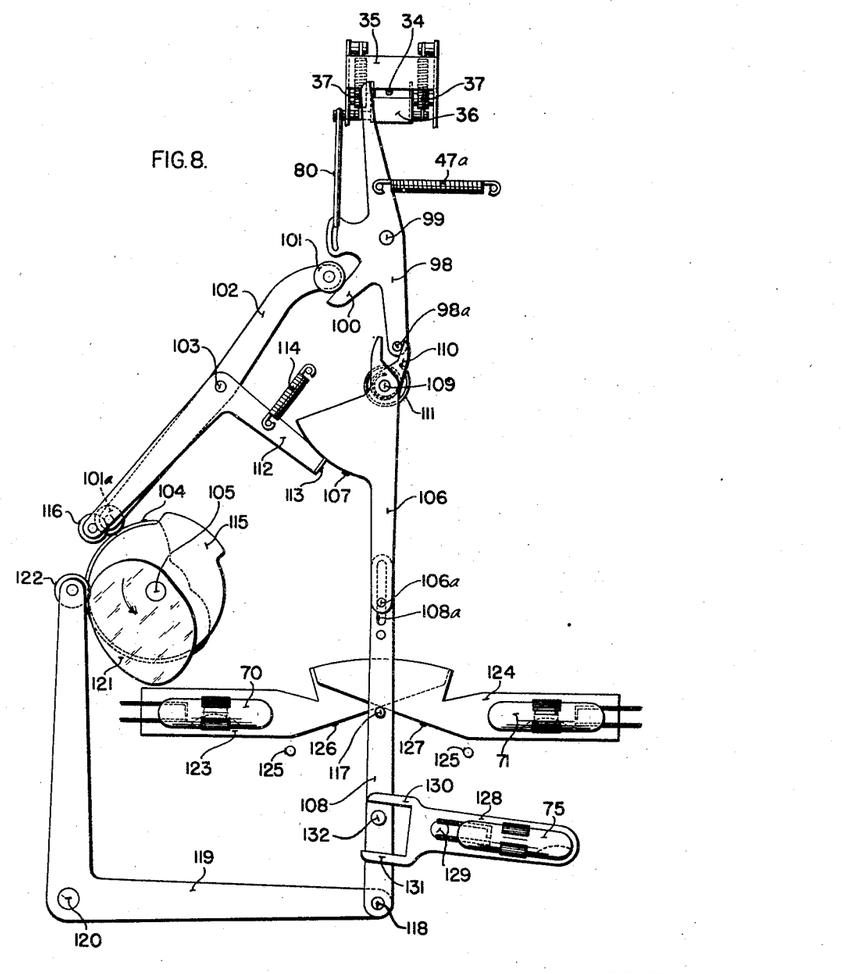
Fig. 8 is a view of a third type of balancing mechanism.

Another embodiment of the relay mechanism for actuating the switches 70, 71 and 75 in the proper sequence is disclosed in Fig. 8. In this embodiment, the pointer 34 is also clamped between a stationary member 35 and a movable member 36 urged upward by springs 37. A link 80 of the type shown in Fig. 7 is used to move member 36 in accordance with the primary feeler 98 that is pivoted at 99 and is biased in a clockwise direction by spring 47a. This feeler has an extension formed thereon which has a slot in it to receive the lower end of link 80. The feeler 98 has at its lower end a pin 98a and has below the extension an arm 100 which is engaged by a roller 101 on a lever 102, pivoted at 103, whose other end has a roller 101a engaged and acted upon by a cam 104 on a shaft 105.

As the primary feeler 98 is moved into engagement with pointer 34, the pin 98a on its lower end is used to position a secondary feeler to control the rebalancing operation. The secondary feeler consists of two parts 106 and 108, the former of which has a brake-edge 107 formed on one side and is pivoted at 109. The end of part 106 which extends above the pivot is adapted to be engaged and moved by the pin 98a to in turn move the second part 108 by means of a pin and slot connection 106a, 108a between the two. The upper end of part 106 is resiliently held in engagement with pin 98a by a finger 110 that is also pivoted at 109 and is biased toward part 106 by a spring 111. Part 106 is held in its adjusted positions by engagement between the brake-edge 107 and a brake 113 on the end of a bell-crank lever 112 that is also pivoted at 103 and biased toward braking position by a spring 114. The brake is periodically released by engagement between a roller 116 on its lower end and the high portion of a cam 115 on shaft 105.

The second part 108 of the secondary feeler is pivotally mounted at 118 on a bell-crank 119, which is in turn pivoted at 120 and has a gravitational bias to bring its roller 122 into engagement with a cam 121 on the shaft 105.

In this embodiment of the invention, the motor switches 70 and 71 are mounted on pivoted members 123 and 124, which have a natural bias clockwise and counter-clockwise respectively, and which bias is limited in a downward direction by pins 125 to a position where the respective switches are open. The switches 70 and 71 are adapted to be closed, upon upward movement of member 108, by the engagement between a pin 117 on said member and the inclined edges 126 and 127 on the members 123 and 124. The switch 75 is mounted on a tiltable member 128, pivoted at 129, that has two fingers 130 and 131 in the path of a pin 132 projecting from part 108.

In the operation of this modification, the cams rotate in a counter-clockwise direction, and a cycle of operation will now be described starting with the parts in the position shown. The lever member 108 has been lifted by bell-crank 119 and cam 121 and is shown as being lowered and near the bottom of its stroke. Just prior to the time that lever member reaches its lowest position, pin 132 will engage finger 131 and tilt member 128 counter-clockwise to a position in which the contacts of switch 75 are closed.

The high portion of cam 115 then comes under roller 116 to remove the brake-member 113 from engagement with edge 107 so the secondary feeler 106, 108 will be free to move with the primary feeler 98 at the same time the low portion of cam 104 starts under roller 101a to permit the primary feeler to move clockwise under the bias of spring 47a. Movement of feeler 98 will first allow abutment 36 to rise and clamp pointer 34 and then permit the feeler to move across in front of the abutment until it engages the pointer. Movement of feeler 98 in a clockwise direction will cause pin 98a to move the lever 106 of the secondary feeler counter-clockwise and will, through the pin 106a and slot 108a, move lever-member 108 a corresponding amount so that pin 117, now at the bottom of its stroke, will be positioned in accordance with the position of the pointer 34. Finger 110, bearing on the back of pin 98a, prevents member 106 from overtraveling. Continued movement of the cams will bring the low portion of cam 115 under roller 116 so that the brake 113 can be applied to edge 107 by spring 114 and thus hold the secondary feeler in its adjusted position for the remainder of the cycle. As the brake is applied, the cam 104 begins to move the primary feeler 98 back to its inactive position, so that the pointer 34 can be released by the cam forcing roller 101 against the finger 100. As the primary feeler moves to its inactive position, as shown, the spring 111 will give so that pin 98a can move finger 110 clockwise, thus leaving the secondary feeler undisturbed. Just prior to the time the feeler 98 reaches its inactive position, the high portion of cam 121 starts under roller 122 to move the bell-crank 119 in a direction to lift member 108 and pin 117, the pin guiding this movement by slot 108a. As pin 117 rises, it will engage first edge 126 or 127, depending upon its inclination from the vertical, to tilt members 123 and 124 to close switches 70 and 71. In the position shown, the pin 117 has been set for the pointer 34 in its mid-position, so the pin engages edges 126 and 127 at the same time to close both switches 70 and 71 at the same time and thus prevent rotation of motor 18. Just as pin 117 reaches the top of its stroke, the pin 132 will engage finger 130 to tilt member 128 clockwise and thus open switch 75 to deenergize the motor circuit. Cam 121 then permits thte bell-crank 119 and lever member 108 to return to their low positions to complete the cycle of operation.

Figure 9:
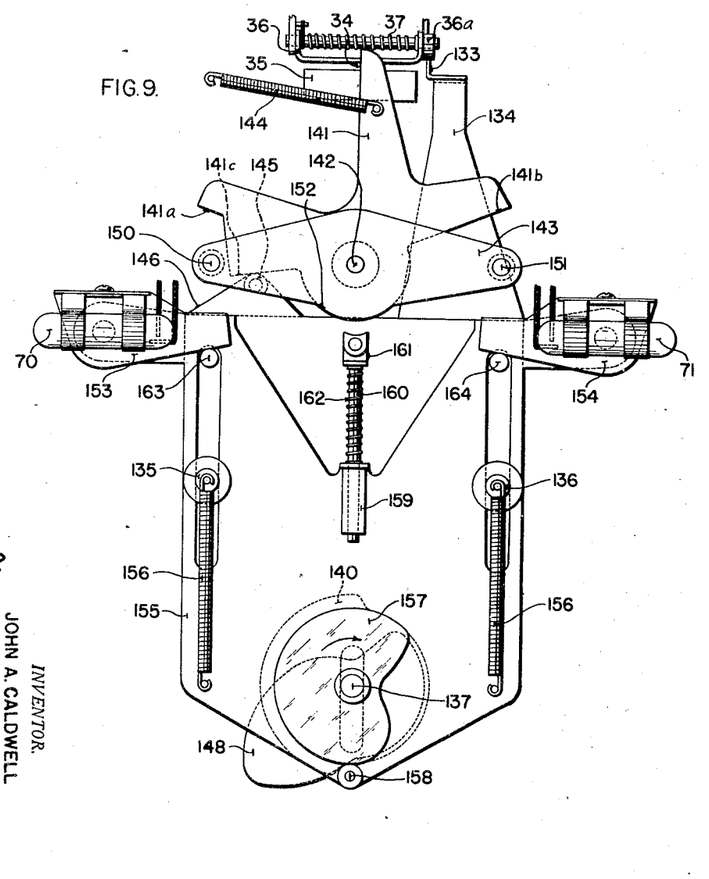
Fig. 9 is a view of still another type of balancing mechanism.
Figure 10:
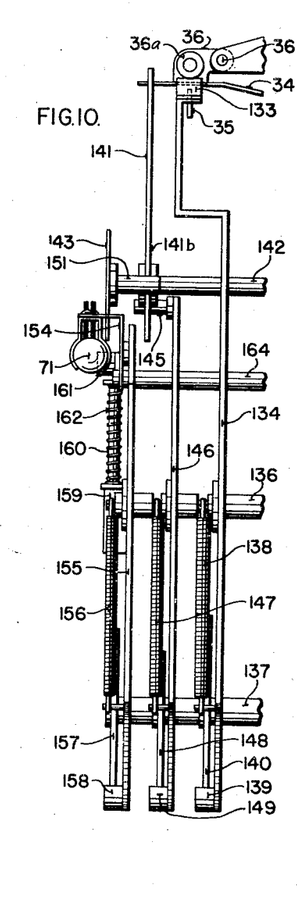
Fig. 10 is a view looking from the right of Fig. 9.

In Figs. 9 and 10, there is disclosed a relay mechanism in which only the two switches 70 and 71 for the motor fields 18a and 18b are used. This form of the invention does away with the necessity of an interruptor switch, but accomplishes the same result as the previous modifications by the simultaneous opening of switches 70 and 71.

The galvanometer pointer 34 is clamped between stationary abutment 35 and movable abutment 36, forced, in this case, downwardly by spring 37. The abutment 36 is adapted to be moved around its pivot 36b by means of the engagement between a roller 36a on one of its ends and an edge 133 on a plate 134 which is vertically slidable on and guided by shafts 135, 136, and cam shaft 137. This plate is normally biased in an upward direction by springs 138 attached at their lower ends to the plate and at their upper ends to shafts 135 and 136 respectively, but is periodically moved down, so that abutment 36 can clamp the pointer, by engagement between a roller 139 on its lower end and a cam 140 on the constantly rotating shaft 137.

The primary feeler 141 is pivoted on shaft 142 and is formed with three edges, 141a for moving the secondary feeler 143 in a counter-clockwise direction, 141b for moving the secondary feeler clockwise, and edge 141c by which it is itself moved clockwise against the force of spring 144. The clockwise movement of feeler 141 is accomplished by roller 145, on the top edge of plate 146, that engages edge 141c of the feeler, which plate 146 is also mounted to slide on shafts 135, 136 and 137 and is biased upwardly by springs 147 that are attached at their lower ends to the plate 146 and at their upper ends, respectively, to shafts 135 and 136. This plate is moved downwardly by engagement between cam 148 on shaft 137 and roller 149 on the plate, so that feeler 141 may be moved into engagement with the pointer 34 by a spring 144. The secondary feeler 143 is also mounted on shaft 142 and has projecting rearwardly from one end pin 150, adapted to be engaged by edge 141a, and projecting rearwardly from the other end pin 151, adapted to be engaged by edge 141b. The secondary feeler 143 also has a brake-surface 152 on its lower edge that is concentric with respect to shaft 142.

The switches 70 and 71 are held in brackets 153 and 154 respectively, which are tiltingly mounted on a third plate 155 and have friction fit thereon so that they will stay in the positions to which they have been moved. The plate 155, also slidably mounted on shafts 135, 136 and 137, is urged upwardly by springs 156 fastened to the plate and shafts 135 and 136, respectively, and is moved downwardly against the force of the springs 156 by engagement between a cam 157 on shaft 137 and roller 158 on plate 155. Also mounted on plate 155 in a bracket 159 is a plunger 160 that has on its upper end a brake-member 161 which will engage with brake-surface 152 as the plate rises. The plunger is urged upwardly by a spring 162 which will give as the plate 155 rises, so that the brake 161 can continue in engagement with surface 152.

Projecting through all three of the plates are two rods 163 and 164 that are adapted to be engaged by the lower edges of brackets 153 and 154, respectively, for a purpose to be described.

In the operation of this modification, the cams on shaft 137 are rotated therewith in a clockwise direction and at a constant speed by motor 78. The secondary feeler, as shown in the drawings, has just been set for a mid-position of pointer 34, and cam 148 will let plate 146 rise slightly to move primary feeler 141 clockwise so that neither edge 141a or 141b will be in engagement with pins 150 and 151. Also at this time, cam 140 will allow plate 134 to rise so that edge 133 can engage roller 36a to lift abutment 36 and free the pointer 34. The above two operations take place at practically the same time, and immediately thereafter the low portion of cam 157 comes over roller 158 to allow plate 155 to rise under the pull of springs 156.

Upward movement of plate 155 will first bring brake 161 into contact with brake-edge 152 of the secondary feeler to prevent subsequent movement thereof. After the brake has been applied, spring 162 will give as the continued movement of plate 155 will bring the upper edges of brackets 153 and 154 into engagement with pins 150 and 151 respectively. With the pointer in mid-position, as shown, the upper edges of the brackets will engage the pins simultaneously, and both of the brackets will be tilted around their pivot points to close switches 70 and 71 at the same time. Closing both switches 70 and 71 at the same time will simultaneously energize both fields 18a and 18b of motor 18, and thus there will be no rotation of motor 18 and no movement of slide-wire 22. If the pointer 34 was, for example, to the left of its mid-position, the feeler 143 would be moved further counter-clockwise, and the upper edge of bracket 153 would engage pin 150 before the upper edge of bracket 154 engaged pin 151.

In any event, the plate 155 carrying the switches 70 and 71 moves upwardly until both of the switches are closed to first energize the motor 18 in the proper direction, depending upon the angular position of secondary feeler 143, and then to stall it. The switches are, in this case, so designed that after the circuit is closed, any subsequent tilting thereof will have no effect on them.

After each of the brackets 153 and 154 has been tilted to close its switch, the high portion of cam 157 starts over roller 158 to lower the plate 155 and the switches. As the plate 155 nears the bottom of its stroke, the brackets 153 and 154 will engage pins 163 and 164, respectively to move them back to their original position and open the switches. As the switches will open at the same angular position, the amount that they have been tilted on the upstroke of plate 155 is immaterial, because they will both reach their opening angle at the same time to simultaneously deenergize both fields of the motor 18.

Just after the switches 70 and 71 have been opened, the low portion of cam 148 will start over roller 149 to move feeler 141 to its extreme clockwise position. This will bring edge 141b into engagement with pin 151 to move the secondary feeler 143 an amount that will raise pin 150 beyond the position it will assume for any right-hand deflection of the pointer 34. At this time, the high portion of cam 140 will move plate 134 downwardly so that the abutment 36 can grip pointer 34 and hold it in its then position.

The high portion of cam 148 now starts over roller 149 to move plate 146 and its pin 145 downwardly so that the primary feeler 141 can swing toward the pointer 34 under the bias of spring 144. As feeler 141 moves counter-clockwise, its edge 141a will first engage pin 150 of the secondary feeler and will then move the secondary feeler until the movement of both is arrested by engagement with the now-clamped pointer 34. The secondary feeler 143 is now positioned in accordance with the position of the pointer 34. Continued rotation of cam 148 will bring it to the position shown in which plate 146 has risen to where roller 145 is again engaging edge 141c preparatory to moving the primary feeler 141 to a position in which the edges 141a and 141b do not engage the pins 150 of 151 before another cycle is begun.

It will be seen from the above-detailed description that I have provided an apparatus that permits the galvanometer pointer to be free from restraint for a large portion of each cycle and thus insures an accurate setting for it. It will also be seen that I have provided a simple and easily operated device that will give an accurate setting of the indicating and recording apparatus because of the manner in which its driving motor is energized.

The use of the secondary feeler is an important feature of this invention since it permits the galvanometer pointer to be freed from restraint during the time the balancing operation is taking place. For this reason, it may be said that the balancing operation occurs at the beginning of a cycle rather than at its end, since the balancing operation is performed while the pointer is free and thereafter its effect is measured.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a measuring instrument, an element movable in accordance with a measurable condition, means to periodically clamp said element in position, a feeler, means to move said feeler into engagement with said element while the latter is clamped, a movable actuating member positioned by said feeler in accordance with the position of said element, means to release said clamping means, means to thereafter move said actuating member, and means to adjust said element controlled by the movement of said actuating member.

2. In a measuring instrument, an element deflectable in accordance with a measurable condition, a feeler, means to move said feeler into engagement with said element, a movable actuating member positioned by said feeler in accordance with the position of said element, a pair of tiltable levers positioned in the path of movement of said member, a pair of switches normally in opened position mounted on each lever, and means to move said member to tilt said levers and thereby close said switches in a sequence determined by the position of said member.

3. In a measuring instrument, an element movable in accordance with a measurable condition, a feeler, means to move said feeler into engagement with said element, a member positioned by said feeler, a pair of tiltable levers, a switch on each lever, said levers being positioned to be contacted by said member, means for moving said feeler out of engagement with said element, and means for thereafter moving said member to tilt first one and then the other of said levers to actuate said switches sequentially, depending upon the position of said member.

4. In a measuring instrument, an element deflectable in accordance with variations in a measurable condition, means to periodically clamp said element in position, a feeler, means to move said feeler into engagement with said element while it is clamped, a member movable by said feeler to a position corresponding to that of said element, an adjusting part, drive means therefor controlled by said member, means to unclamp said element, and means to thereafter cause said member to control said drive means in accordance with the position of said member.

5. In a measuring instrument, an element deflectable in accordance with variations in a measurable condition, a member means to periodically position said member in accordance with the deflection of said element, a pair of tiltable levers having their ends crossed, each crossed end being provided with an inclined edge, and means to move said member into engagement with said crossed ends, the sequence of engagement with the ends depending upon the position of said member.

6. In a measuring instrument, an element movable in accordance with variations in a measurable condition, a clamp for periodically clamping said element in its then position, a feeler, means moving said feeler into contact with said element, a pair of tiltable levers, a member, adapted to contact said levers, movably by said feeler to a position corresponding to that of said element, means to hold said member in its adjusted position, means to move said feeler away from said pointer and release said clamp, and means for thereafter moving said member and holding means until said member has contacted both of said levers.

7. In a measuring instrument, the combination with an element movable in accordance with variations in a measurable condition, a feeler movable into engagement with said element, a secondary feeler movable by said feeler to a position corresponding to that of said element, an adjusting part, a reversible motor drive therefor, a first switch adapted to energize said motor for rotation in one direction, a second switch adapted to energize said motor for rotation in the other direction, said motor being stalled when both switches are closed, means to move said secondary feeler to close first one then the other of said switches, depending upon the position of said element and secondary feeler, and means to deenergize said motor before said switches are opened.

8. In a measuring instrument, the combination with an element deflecting on either side of a neutral position in accordance with variations in a measurable condition, a clamp adapted to periodically hold said element in its then position, a feeler to engage said element while it is clamped, an actuating member, means to move said actuating member by said feeler to a position corresponding to that of said element, means to hold said actuating member in its adjusted position, means to release said clamp from said element, and means thereafter actuated by said actuating member to return said element toward its neutral position.

9. In a measuring instrument, a pointer movable in accordance with a measurable condition, a feeler, means for moving said feeler into contact with said pointer, a pair of tiltable switch supporting arms, a switch carried by each arm, a member underlying said arms adjustable by said feeler to a position corresponding to that of said pointer, a third switch, means for moving said member upwardly to contact said arms to actuate said first switches and means to close said third switch before the first switches are actuated and to open said third switch when said first switches have been actuated.

10. In a measuring instrument, a pointer movable in accordance with a measurable condition, a feeler, means to cause said feeler to engage said pointer, an actuating member positioned by said feeler to a position corresponding to that of said pointer, a pair of switch carrying levers normally biased to switch opening position and adapted to be moved by said member, a third switch carrying lever, means to move said actuating member to move said first levers to switch closing position, and means to move said third lever to switch closing position before said first levers are moved and to move said third lever to switch opening position after said first levers have been moved.

11. In a measuring instrument, a cycle of operation which consists of clamping an indicating element, taking a measurement of the position thereof with a primary member, setting a secondary measuring member from the primary member, releasing the clamping force and the primary member, and thereafter effecting an adjusting operation of the indicating element from the position of the secondary member.

12. In a measuring instrument, a cycle of operation which consists of clamping an indicating element, measuring the position thereof with a primary member, positioning a secondary member by said primary member to a position corresponding to that of the element, holding said secondary member in position, releasing the clamping effect on said element and moving said primary member away from measuring position, and thereafter causing an adjusting operation to be performed on said indicating element, the operation being controlled by the position of said secondary member.

13. In a measuring instrument, a first tiltable lever having a switch mounted above its pivot and having an upturned end, a second tiltable lever having a switch above its pivot and having a turned-down end, the ends of the two levers crossing each other, an adjustable member having a projection thereon extending under both lever ends, means for adjusting said member in accordance with the value of a variable condition, and means to lift said member so that it will sequentially tilt said levers and thereby actuate said switches.

14. In a measuring instrument, an element deflectable on either side of a neutral position, means to periodically clamp said element in position, a feeler adapted to be moved from an initial position into engagement with said element while it is clamped, an actuating member movable by said feeler to a position corresponding to that of said element, means to hold said actuating member in position, means to release said clamping means and move said feeler to its initial position, and means actuated by said actuating member after said element has been unclamped to adjust said element toward its neutral position.

15. The combination of two levers pivoted to turn about a common axis, each from an initial position to a second position, the ends of said levers remote from said axis being crossed, an actuating member pivoted about a second axis and having a part adapted to engage said crossed ends, means to pivot said actuating member about its axis to a position corresponding to the value of a measurable condition, and cyclic operating means to move said second axis and actuating member so that said part will engage said crossed ends to tilt said levers.

16. In a measuring instrument, an element movable in response to variations in a measurable condition, a member positioned in accordance with the position of said element, a reversible motor driven in response to the position of said element, a first switch to energize said motor for rotation in one direction, a second switch to energize said motor for rotation in the other direction, a third switch dominating said first two switches, means to move said member to close one of said first two switches in accordance with its position, and means to thereafter open said third switch.

17. In a measuring instrument, an element movable in response to variations in a measurable condition, an actuating member movable to a position in proportion to that of said element, a first switch carrying member, a second switch carrying member, means to periodically move said actuating member into engagement with said switch carrying members in a sequence determined by the initial position of said actuating member, a third switch carrying member, and means to move said third switch carrying member into one position after said first two switch carrying members have been moved and to return said third switch carrying member to its first position before said first two switch carrying members are again moved.

18. The combination with a deflecting meter element, of a member engaging said element on a deflection of the latter in either direction from a predetermined position, a reversible electrical motor, energizing circuits therefor, means under control of said member for controlling said circuits and including settable means, a mechanism operable to energize said circuits following disengagement of said element by said member.

19. In a measuring instrument, an element movable in accordance with variations in a measurable condition, a feeler, means to move said feeler from a predetermined position to a position determined by engagement with said element, a pair of tiltable levers, a member adapted to engage and tilt said levers, movable by said feeler to a position corresponding to that of said element, means to hold said member in its adjusted position and move said feeler away from said element, means to thereafter move said member and holding means until said member has engaged and tilted both of said levers, and means operated thereby to move said element toward a predetermined position.

20. In a measuring instrument, an element deflectable from a neutral position in accordance with variations in the value of a variable condition, a feeler, means to move said feeler into engagement with said element, a movable actuating member adjusted by said feeler to a position corresponding to the position of said element, a pair of tiltable levers positioned in the path of movement of said actuating member, a switch normally in open position mounted on each lever, means to move said actuating member to tilt said levers and thereby close said switches in a sequence determined by the position of said member, an adjusting part, and means controlled by the closing of said switches to adjust said part in accordance with the position of said member.

21. In a measuring instrument, a pointer movable to either side of a neutral position in response to variations in the value of a measurable condition from a given value, a feeler, means to move said feeler into engagement with said pointer, a pair of tiltable switch supporting levers each of which is provided with a switch, a member underlying said levers and moved by said feeler to a position under said levers corresponding to the position of said pointer, a third switch, a motor energized for rotation in one direction or the other when one of said first switches and said third switch is closed, means to move said member upwardly to engage said levers, means to close said third switch before said first switches are actuated and to open said third switch when said first switches are actuated, and means operated by said motor to adjust said pointer toward its neutral position.

22. In a potentiometer of the type in which the variation in a temperature being measured produces an unbalance of a potentiometer circuit and in which an electric motor is used to rebalance the potentiometer circuit, the combination with means to control the operation of the motor comprising a first feeler that is positioned in accordance with the potentiometer unbalance, a member positioned by said feeler, means to maintain said member in its adjusted position, means to move said feeler to an inactive position and to thereafter move said member and maintaining means through a path dependent upon the position of the member, and means operated by said member to run the motor in a direction to rebalance the potentiometer circuit.

23. In a potentiometer provided with a pointer that is deflectable from a neutral position in response to potentiometer unbalance produced by changes in the voltage of a thermocouple that is subjected to a temperature being measured, and which is provided with a motor to rebalance the potentiometer, the combination of a feeler movable from a given position to a position determined by engagement with the pointer, a member movable by said feeler from a second given position to a position dependent upon that of the pointer, means to hold said member in its adjusted position, means to move said feeler to its given position and to thereafter move said member and its holding means through a path depending upon the position of the member, and means operated by said member as it moves to engage the motor in a direction to rebalance the potentiometer.

JOHN A. CALDWELL.